(12) United States Patent
Fleury et al.

(10) Patent No.: US 11,654,963 B2
(45) Date of Patent: May 23, 2023

(54) LIGHTWEIGHT SUSPENSION UPRIGHT OR KNUCKLE

(71) Applicants: Aktiebolaget SKF, Gothenburg (SE); SKF Aerospace France S.A.S., Montigny-le-Bretonneux (FR)

(72) Inventors: Valentin Fleury, Romans-sur-Isère (FR); Marco Falossi, San Raffaele Cimena (IT); Remi Sarlin, Allex (FR)

(73) Assignees: Aktiebolaget SKF; SKF Aerospace France S.A.S.

( * ) Notice: Subject to any disclaimer, the term of this patent is extended or adjusted under 35 U.S.C. 154(b) by 0 days.

(21) Appl. No.: 17/324,218

(22) Filed: May 19, 2021

(65) Prior Publication Data

US 2021/0269090 A1 Sep. 2, 2021

Related U.S. Application Data

(63) Continuation of application No. 16/507,112, filed on Jul. 10, 2019, now Pat. No. 11,299,201.

(30) Foreign Application Priority Data

Aug. 8, 2018 (IT) .................. 102018000007980

(51) Int. Cl.
*B62D 7/18* (2006.01)
*B29C 43/00* (2006.01)
(Continued)

(52) U.S. Cl.
CPC .............. *B62D 7/18* (2013.01); *B29C 43/003* (2013.01); *B29C 45/0005* (2013.01);
(Continued)

(58) Field of Classification Search
CPC ..... B62D 7/18; B29C 43/003; B29C 45/0005; B29C 66/721; B29C 70/86; B60G 99/002;
(Continued)

(56) References Cited

U.S. PATENT DOCUMENTS

| 5,078,370 A | 1/1992 | McClellan |
| 5,454,585 A | 10/1995 | Dronen et al. |

(Continued)

FOREIGN PATENT DOCUMENTS

| CN | 102381353 | 3/2012 |
| DE | 102007053120 | 5/2009 |

(Continued)

OTHER PUBLICATIONS

Feraboli, et al., Lamborghini "Forged Composite" Technology for the Suspension Arms of the Sesto Elemento; pp. 1-13; 2011.
(Continued)

*Primary Examiner* — James A English
*Assistant Examiner* — Daniel M. Keck
(74) *Attorney, Agent, or Firm* — Reed Smith LLP

(57) ABSTRACT

A lightweight suspension upright or knuckle for a vehicle including a bearing connection interface arranged coaxial with the rolling bearing and including a first sleeve element and a second sleeve element arranged radially outside the first sleeve element and including a BMC/LFT/DLFT annular body that is sandwiched between a first and second shell elements, which are coupled together in a radially superimposed manner and which are preferably obtained in a semi-cured state as self-supporting elements, to be chemically and mechanically bonded together and with the BMC/LFT/DLFT annular body in a later stage during a step of
(Continued)

forming a core (11) to fill either completely or partially an empty space (12) delimited between the first and second shell elements (8,9).

18 Claims, 4 Drawing Sheets

(51) Int. Cl.
    *B29C 45/00*     (2006.01)
    *B29C 65/00*     (2006.01)
    *B60G 99/00*     (2010.01)
    *B29C 70/86*     (2006.01)
    *B29L 31/30*     (2006.01)

(52) U.S. Cl.
    CPC .......... *B29C 66/721* (2013.01); *B60G 99/002* (2013.01); *B29L 2031/30* (2013.01); *B60G 2204/43* (2013.01); *B60G 2206/50* (2013.01); *B60G 2206/7101* (2013.01); *B60G 2206/8101* (2013.01); *B60G 2206/821* (2013.01)

(58) Field of Classification Search
    CPC ........ B60G 2204/43; B60G 2206/7101; B60G 2206/8101; B60G 2206/821; B60G 2204/418; B60G 2206/014; B60G 2206/82; B60G 2206/50; B29L 2031/30
    See application file for complete search history.

(56) References Cited

U.S. PATENT DOCUMENTS

| | | |
|---|---|---|
| 2009/0302514 A1 | 12/2009 | Grabarz et al. |
| 2011/0056785 A1* | 3/2011 | Marquar ............... B60G 15/07 156/283 |
| 2016/0121926 A1 | 5/2016 | Peters et al. |
| 2016/0121927 A1 | 5/2016 | Schaake et al. |
| 2017/0008558 A1 | 1/2017 | Kruger et al. |
| 2017/0210187 A1 | 7/2017 | Meyer et al. |
| 2017/0210418 A1 | 7/2017 | Sakuma |
| 2018/0037258 A1 | 2/2018 | Buschjohann et al. |
| 2019/0315173 A1 | 10/2019 | Kim et al. |
| 2020/0307332 A1 | 10/2020 | Faloss et al. |

FOREIGN PATENT DOCUMENTS

| | | | |
|---|---|---|---|
| DE | 102013209987 | 11/2014 | |
| DE | 102015114768 A1 * | 8/2016 | ........... B60G 13/003 |
| DE | 102015209001 | 11/2016 | |
| DE | 102015212112 | 5/2017 | |
| DE | 202017100982 | 7/2017 | |
| DE | 102017104089 | 9/2017 | |
| EP | 1070604 | 1/2001 | |
| FR | 3086579 A1 * | 4/2020 | ........... B60G 11/16 |
| GB | 8330622 | 12/1983 | |
| IN | 1187CHN2014 | 10/2015 | |
| JP | H04113278 | 10/1992 | |
| JP | H10129225 | 5/1998 | |
| JP | 3189709 | 7/2001 | |
| KR | 20130022152 | 3/2013 | |
| KR | 20150065222 | 6/2015 | |
| KR | 101549916 | 9/2015 | |
| KR | 20150103645 | 9/2015 | |
| KR | 102187630 | 12/2020 | |
| WO | 2005051624 | 2/2008 | |
| WO | 2018048249 | 3/2018 | |
| WO | 20190111200 | 6/2019 | |

OTHER PUBLICATIONS

Composite-Lightweight Rear Suspension Knuckle for a High Volume Passenger Vehicle; pp. 1-4; 2017.
Eickhoff, et al., Development of a Fiber-Composite Suspension Strut/Knuckle Module; pp. 267-280; 2010.
International Search Report for corresponding Italy Patent Application No. 102018000007980 dated Apr. 18, 2019.
Office Action for corresponding China Patent Application No. 201910644997.7 dated Sep. 27, 2022.

\* cited by examiner

LIGHTWEIGHT SUSPENSION UPRIGHT OR KNUCKLE

CROSS-REFERENCE TO RELATED APPLICATIONS

This application is a continuation application of Ser. No. 16/507,112 filed Jul. 10, 2019, which claims priority to Italian patent application no. 102018000007980 filed on Aug. 8, 2018, the contents of which are fully incorporated herein by reference.

FIELD OF THE INVENTION

The present invention concerns a lightweight suspension upright or knuckle, in particular a steering knuckle, for a vehicle, the lightweight suspension upright or knuckle 10 integrating a wheel hub bearing module.

BACKGROUND OF THE INVENTION

As it is known, e.g. from US2016121927A1, in the interests of fuel economy there is an increasing drive within the automotive industry towards weight reduction of the component parts of vehicles. One such component is the steering knuckle, which connects the wheel bearing to the vehicle suspension and, more in general, such components include all the uprights of the vehicle suspension. Typically, uprights and steering knuckles are made of cast iron or of a light alloy and there is still potential for weight savings by manufacturing the knuckle/upright from a more lightweight material, such as fiber-reinforced polymer.

However, a problem there exists in joining the wheel bearing to the composite material of the upright/knuckle.

According to US2016121927A1 a whole steering knuckle composite body comprising a fiber-reinforced polymeric material is over molded onto a sleeve element acting as a bearing connection interface and consisting of the outer ring of the rolling bearing unit constituting the wheel hub, or of a metal ring designed to be connected with the rolling bearing.

The fiber-reinforced material comprises a long-fiber molding compound that is over molded to a first joining surface on the sleeve element, whereby the first joining surface is a radially outer surface of the sleeve element. In addition, the first joining surface is provided 30 with a recessed portion into which the long-fiber molding compound flows, for mechanically locking the sleeve element to the composite body in an axial direction.

However, to mold a whole knuckle body (or a whole suspension upright) onto a rolling bearing, or anyway even onto a connection interface consisting of a metal sleeve, may be not a simple and cheap operation. Moreover, the transmission of forces between the bearing and the knuckle body may be not always optimized, in particular during cornering. Finally, the steering knuckle according to US2016121927A1, though lighter than a traditional metal alloy steering knuckle, may result to be still too heavy for the majority of the applications.

BRIEF SUMMARY OF THE INVENTION

The object of the present invention is to provide a suspension upright or knuckle, in particular a steering knuckle, for a vehicle, including a hub bearing unit and which is easy and economical to be manufactured, though ensuring an optimized transmission of forces between the hub bearing unit and the knuckle/upright body and a low weight.

According to the invention, a suspension upright or knuckle for a vehicle is therefore provided having the features described in the appended claims.

BRIEF DESCRIPTION OF THE SEVERAL VIEWS OF THE DRAWING

The invention will now be described with reference to the accompanying drawings, which illustrate a non-limiting embodiment thereof, in which.

DETAILED DESCRIPTION OF THE INVENTION

Figure 1:
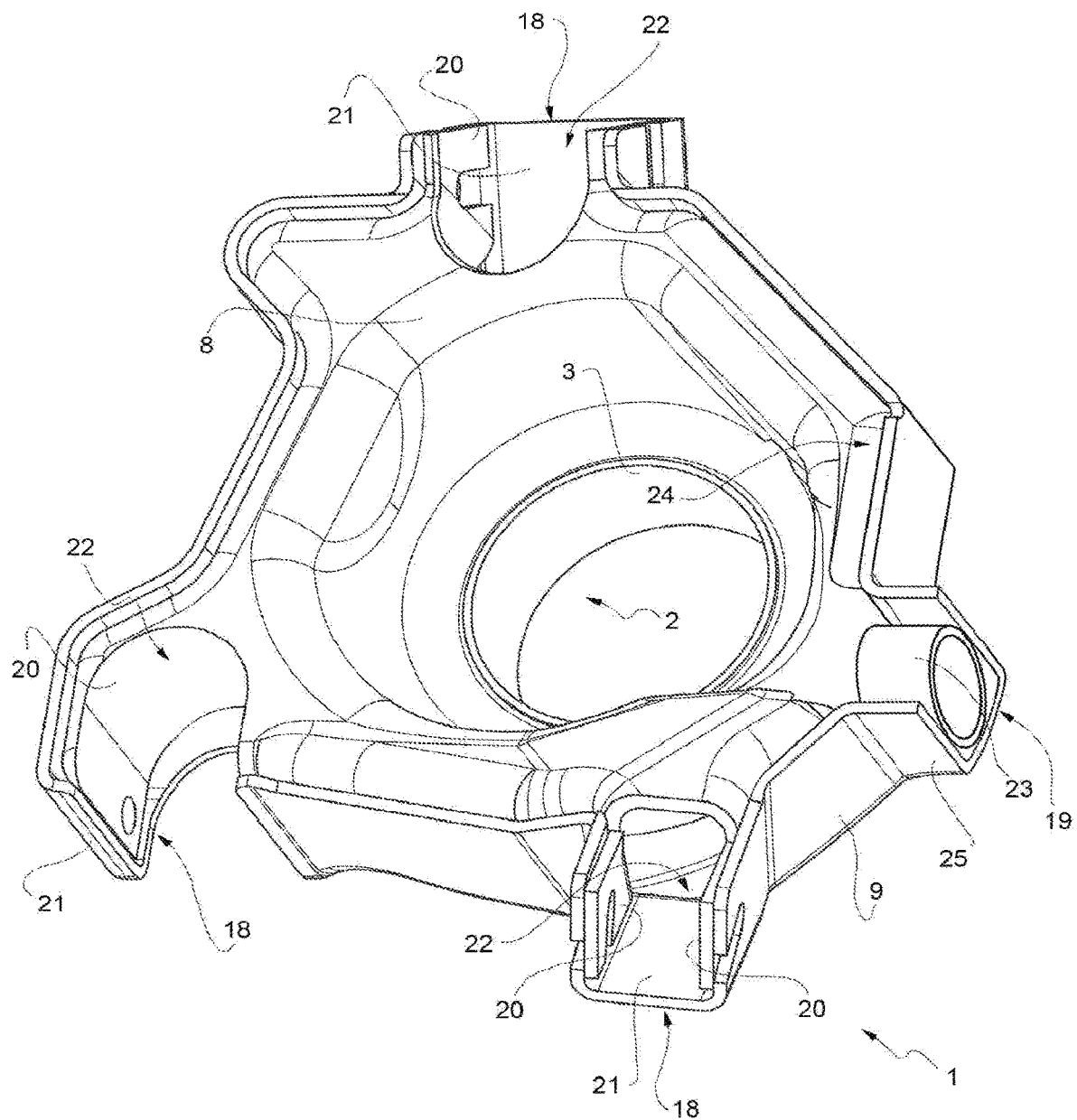
FIG. 1 schematically illustrates a three quarter axonometric view from the rear of the suspension upright or knuckle according to the invention, including a hub bearing module.
Figure 2:
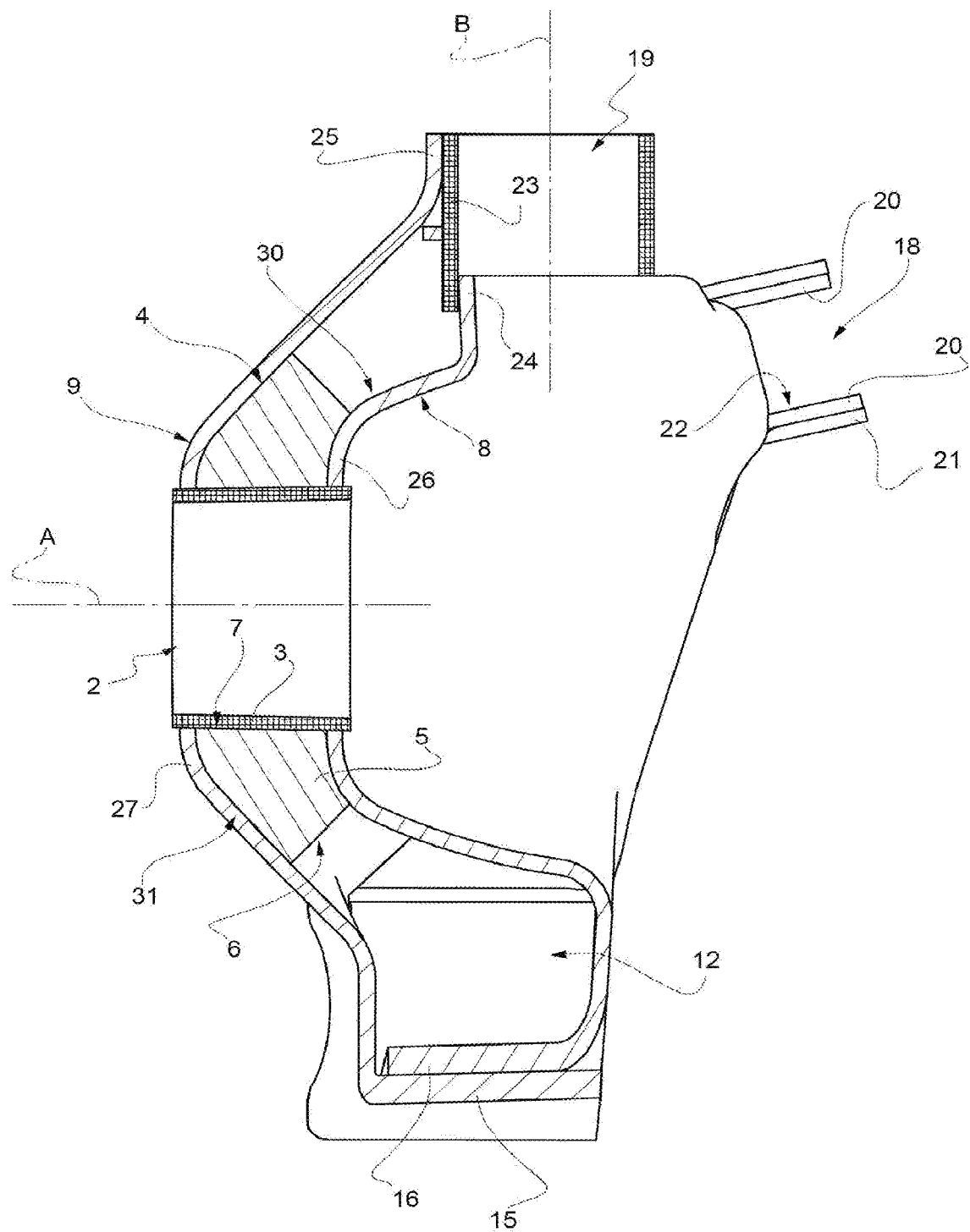
FIG. 2 illustrates in a schematic way a horizontal sectional view of the suspension upright or knuckle according to the invention in a first intermediate step of production thereof, taken along a diametral plane of the hub bearing module.
Figure 3:
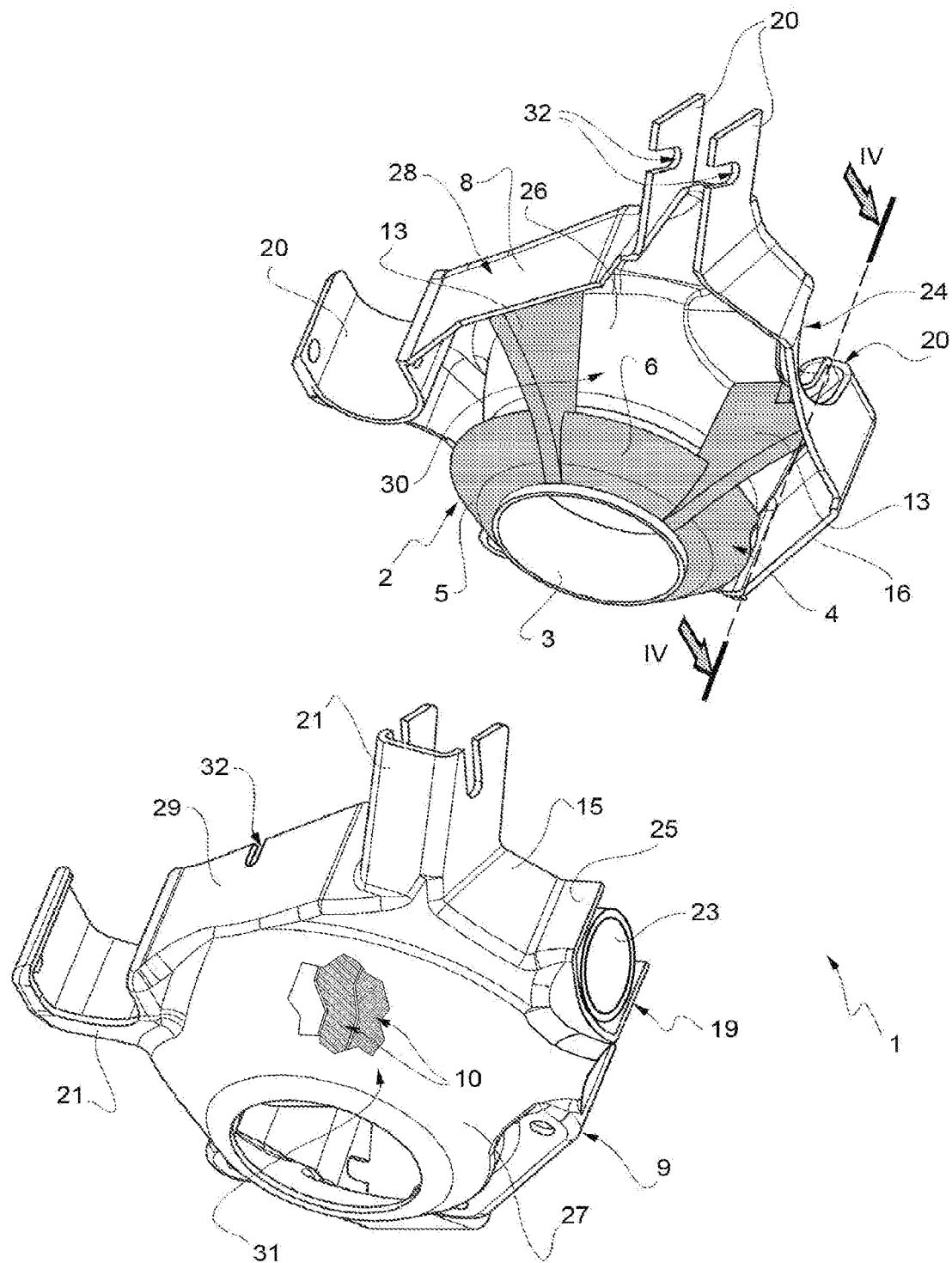
FIG. 3 illustrates schematically an axonometric exploded view of the suspension upright or knuckle of FIG. 1 in a second intermediate step of production thereof.

With reference to FIGS. 1 to 3, the number 1 indicates as a whole a lightweight suspension upright or knuckle (a rear knuckle in the non-limitative embodiment shown) for a vehicle, the latter being not shown for sake of simplicity. What is described may also apply to a steering knuckle.

The lightweight suspension upright or knuckle 1 is represented in a schematic, non-limitative manner only, in order to make clearer the concept on which the invention is based. It is therefore clear that it may have any suitable different shape, so that the invention is not limited in any manner to the specific embodiment shown.

According to one aspect of the invention, the suspension upright or knuckle 1 is made, in a manner that will be described in detail herein below, in a composite material, e.g. a fiber reinforced synthetic plastic resin.

Contrary to the teachings of US2016121927A1, however, it is not molded m one piece over a bearing interface constituted by a metallic sleeve.

The suspension upright or steering knuckle 1 comprises in fact a bearing connection interface 2 for receiving a wheel bearing, the latter being known and not shown (at least in its entirety) for sake of simplicity.

The bearing connection interface 2 includes a first sleeve element 3 having a cylindrical shape and an axis of symmetry A (FIG. 2). In the non-limiting example shown, the first sleeve element 3 is metallic and preferably consists of a steel outer ring of a wheel rolling bearing, known and not shown for sake of simplicity; the outer ring or first sleeve element 3 is shown in a schematic way only, for sake of simplicity, so e.g. the tracks for the rolling bodies are not shown. Alternatively, the first sleeve element 3 may be configured to receive in known manner, e.g. by interference fitting, the wheel bearing and may be, in this case, made either of a metal alloy or of a fiber reinforced synthetic plastic.

According to one aspect of the invention, the bearing connection interface 2 also 20 comprises a second sleeve element 4 arranged radially outside the first sleeve element 3 and comprising an annular body 5 having a radially outer lateral surface 6 and a radially inner lateral surf ace 7.

The annular body 5 is made of a composite material, which, according to a preferred aspect of the invention, is selected from the group consisting of BMC (Bulk Molding Compound), LFT (Long Fiber Thermoplastic) and DLFT (Direct Long Fiber Thermoplastic).

BMC, as well as LFT/DLFT, are synthetic plastic materials in which individual reinforcing fibers of considerable length (usually ½ inch or 12 mm) are uniformly dispersed within a synthetic plastic matrix without a specific orientation (or oriented by the flow during the compression but never arranged in layers) while, e.g., in SMC materials the fibers are disposed in layers. In BMC materials the synthetic plastic matrix is generally formed by a thermosetting resin (recently also by a thermoplastic resin) and such materials are adapted to be formed, generally, by compression molding; in LFT/DLFT materials the synthetic plastic matrix is formed by a thermoplastic resin and such materials are adapted to be formed by injection molding. Moreover, in both the BMC and LFT materials the reinforcing fibers are of uniform length.

Preferably, in the final, molded material the individual reinforcing fibers form groups of fibers aligned with respect to each other, and the groups are uniformly dispersed randomly in the matrix, in order to give rise to a nearly isotropic material.

The annular body 5 is coaxial with the first sleeve element 3.

The radially inner lateral surface 7 is mechanically coupled to the first sleeve element 3 in any known manner, e.g. by chemical and/or mechanical (e.g. by friction) adhesion and/or owing to interlocking mechanical means, known and not shown for sake of simplicity: for example, the outer lateral surface of the first sleeve element 3 is knurled or lettered or otherwise machined using mechanical, chemical or optical processes, such as to create thereon a surface texture and/or it is provided with grooves, ribs or pins which may receive/be embedded in the composite material of the annular body 5.

According to a further aspect of the invention, the lightweight suspension upright or knuckle 1 further comprises a first shell element 8 and a second shell elements 9, both generally cup-shaped and both molded in a high-performance fiber reinforced composite material and arranged coaxial with the first sleeve element 3.

According to a further aspect of the invention, the shell elements 8, 9 are made of mats or plies 10 (FIG. 3) of continuous reinforcing fibers embedded in a polymer matrix and stacked onto one another; mats are long fiber fabrics where the fibers are randomly oriented in the fabric; in plies, on the contrary, the fibers of each plie are mono-directionally oriented.

In particular, the fibers of the plies 10 forming the shell elements 8, 9 are of a length of the same overall dimension of the shell elements 8, 9 themselves and are arranged in superimposed layers, wherein each layer is formed by fibers of the same length unidirectionally oriented according to a preferred direction chosen according to the needs so as to obtain the maximum mechanical property along the chosen preferred direction: for example, the fibers of a first plie 10 may be oriented axially, the fibers of a second plie 10 stacked onto the first plie may be oriented at 45° or at 90° with respect to the fibers of the first plie, etc.

According to the invention, the mats or plies 10 have been molded together, preferably are compression molded after having stacked them onto one another within a suitable mold, so as to obtain the first and second shell elements 8 and 9.

Moreover, the first shell element 8 is provided integrally, as it will be seen, with the bearing connection interface 2 and the second shell element 9 is fitted upon the first shell element 8, radially outside or inside thereof and radially and peripherally mating therewith, with the BMC/LFT/DLFT annular body 5 of the bearing connection interface 2 sandwiched (FIGS. 2 and 4) between the first and second shell element 8 and 9.

Finally, according to a further aspect of the invention, the lightweight suspension upright or knuckle 1 further comprises a core 11 filling either completely or partially an empty space 12 (FIG. 2) delimited there between by the first and second shell element 8, 9 when coupled; the core 11, in the finished suspension upright or knuckle 1, comprises the BMC/LFT/DLFT annular body 5, which represents a central portion of the core 11.

The radially outer lateral surface 6 of the BMC/LFT/DLFT annual body is mechanically and chemically coupled with the first and second shell element 8,9, either directly or indirectly.

In particular, the core 11 comprises one or more radial stiffeners 13 molded in the same BMC/LFT/DLFT material of the annular body 5 between the latter and the first and the second shell elements 8, 9 and mechanically connecting the first and second shell elements 8, 9 to each other and to the BMC/LFT/DLFT annular body 5.

The core 11 further comprises a lightweight foam material 14 (FIG. 4) filling completely the empty space 12 between the first and second shell element 8, 9 and within which foam 14 the BMC/LFT/DLFT annular body 5 and the radial stiffeners 13 are embedded; the foam material 14 also fluid-tight seals respectively mating peripheral edges 15, 16 of the second shell element 9 and of the first shell element 8, respectively and helps to join the shell elements 8,9 integral to each other.

The lightweight suspension upright or knuckle 1 further comprises at least one first attachment interface 18 and at least one second attachment interface 19, which are both only schematically shown, configured to connect in use the suspension upright or knuckle 1 to control or support elements therefor of the vehicle, known and not shown for sake of simplicity.

In the non-limiting embodiment shown, the suspension upright or knuckle 1 comprises three first attachment interface 18, each comprising non-annular, concave superimposed first peripheral portions 20,21 of the first shell element 8 and of the second shell element 9, respectively.

Portions 20,21 are radially outstanding i.e. radially projecting in cantilever fashion from the peripheral edges 16, 15 of the respective shell elements 8,9 and are arranged in contact to each other, superimposed/stacked onto each other.

Portions 20, 21 are configured so as to form, when coupled, three dimensional receiving seats 22 and are mechanically and chemically connected/bonded integral to each other in direct manner.

The at least one second attachment interface 19 comprises, instead, a third sleeve element 23 made of mats or plies 10 (not shown) of continuous reinforcing fibers embedded in a polymer matrix and stacked onto one another, as the shell elements 8,9, preferably plies wherein the fibers of each plie 10 are mono-directionally oriented.

The third sleeve element 23 has a general axis of symmetry B arranged at least nearly perpendicular or perpendicular to the axis A The third sleeve element 23 is mechanically and chemically connected in direct manner to adjacent opposite second peripheral portions 24, 25 of the first and second shell elements 8, 9, so as to integrally connect the first and second shell elements 8,9 to each other.

Figure 4:
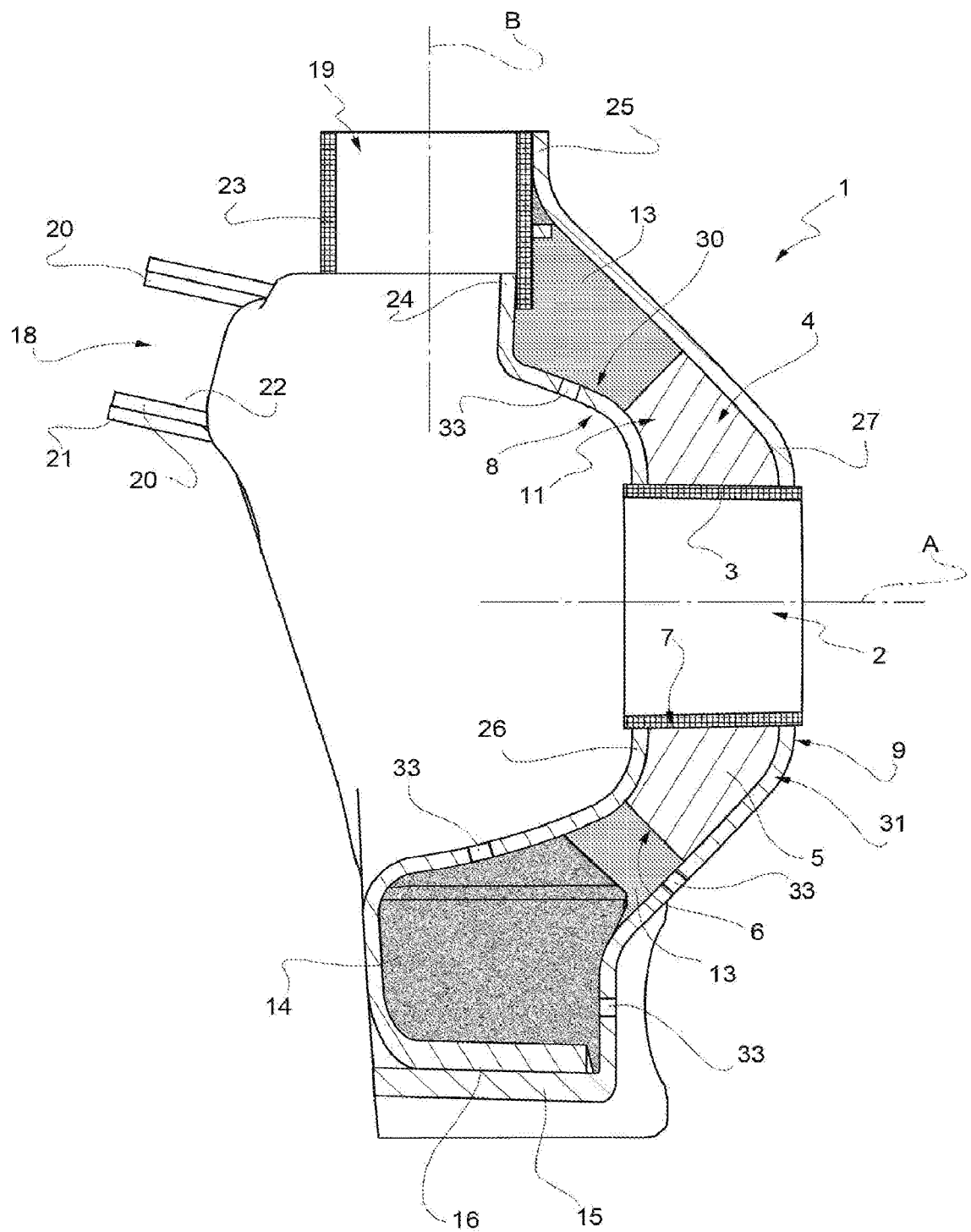
FIG. 4 illustrates schematically a horizontal sectional view of the suspension upright or knuckle according to the invention taken along a diametral plane of the hub bearing module.

In particular, the third sleeve element 23 is at least in part sandwiched between the opposite second peripheral portions 24, 25 of the first and second shell elements 8,9 (FIGS. 2 and 4).

Though being of general cylindrical shape, the sleeve element 23 is peripherally recessed towards the shell element 8, in order to better couple with the portion 24 and to be able to be inserted upon edge 16 of shell element 8 by an axial movement along axis A of the shell element 9 already provided with the sleeve element 23.

In the non-limitative but preferred embodiment shown, in fact, the second shell element 9 is fitted upon the first shell element 8, radially outside thereof.

Each first and second cup-shaped shell element 8, 9 comprises a bottom annular wall, indicated with 26 and 27 respectively, and a lateral wall, indicated with 28 and 29 respectively (FIG. 3), surrounding radially on the outside the respective annular bottom wall 26, 27 and axially projecting therefrom.

The lateral walls 28, 29 delimit the peripheral edges 16 and 15 of the first and second shell elements 8, 9 and axially projecting towards each other. Moreover, they are mechanically and chemically joined in contact to each other in a radially superimposed manner, so as to render the shell elements 8, 9 integral to each other.

Preferably, the annular bottom walls 26,27 of the first and second shell elements 8,9 are not planar, but have at least a portion thereof bulged in an axial direction (along axis A).

A bulged portion 30 of the annular bottom wall 26 of the first shell element 8 axially projects towards the second shell element 9 within a cavity of the first shell element 8 delimited by the lateral wall 28 and by the annular bottom wall 26 thereof.

A bulged portion 31 of the annular bottom wall 27 of the second shell element 9 axially projects from the lateral wall 29 thereof on the side opposite to the first shell element 8 and to the lateral wall 29 of the second shell element 9 itself.

The BMC/LFT/DLFT annular body 5 of the bearing interface 2 is sandwiched between at least the bulged portions 30, 31 of the annular bottom walls 26, 27 of the first and second shell elements 8, 9.

From what described above, it is evident that in case of a car corner knuckle, the suspension upright or knuckle 1 is made of four elements:

the two shell elements 8,9 made of high-performance composite material which can be pre-impregnated, fiber (glass or carbon or aramid) reinforced thermoset material or pre consolidated, fiber reinforced, thermoplastic material. These shell elements 8,9 can be locally reinforced by the deposition of thermoset or thermoplastic tapes to increase locally their radial thickness and so the overall car corner knuckle performance (stiffness and ultimate tensile strength);

An injected/compressed core 11 material between the two shells 8, 9. This material can be either an injected low-cost material (foam 14, polymer, low reinforced polymer or long fiber thermoplastic (LFTP)) or a compressed low cost material (Bulk Molding Compound—BMC)

The overmoulding integration of an HBU (Hub Bearing Unit) or at least its outer ring inside an injected core material forming the annular body 5.

Moreover, the further integration of metallic or elastomeric bushings by injection molding or over-molding may be accomplished housing and bonding them e.g. in the receiving seats 22

Manufacturing Aspects

From what described above, it is also clear that the present invention also relates to a method for obtaining a lightweight suspension upright or knuckle 1 for a vehicle comprising a bearing connection interface 2 for receiving a wheel bearing, preferably an HBU, the bearing connection interface 2 including a first sleeve element 3 preferably consisting in the outer ring of the HBU.

The method of the invention comprises the steps of:

i)—providing the bearing connection interface 2 with a second sleeve element 4 30 arranged radially outside the first sleeve element 3 and comprising an annular body 5 having a radially outer lateral surface 6 and a radially inner lateral surface 7, the annular body 5 being formed by injection or compression molding a fiber-reinforced composite material directly upon a radially outer lateral surface of the first sleeve element 3 so as to mechanically couple the second sleeve element 4 to the first sleeve element 3;

ii)—forming, preferably by compression molding, the first and a second shell elements 8,9, both generally cup-shaped;

iii)—joining the first shell element 8 and second shell element 9 integral with the bearing connection interface 2 and with each other, the second shell element 9 being arranged onto the first shell element 8, radially outside or inside thereof and radially and peripherally mating therewith, sandwiching the annular body 5 of the bearing interface 2 there between;

iv)—forming a core 11 filling an empty space 12 delimited between the joined first and second shell element 8, 9, the core 11 being formed so as to include the annular body 5 and to mechanically and chemically couple the radially outer lateral surface 7 of the annual body 5 with the first and second shell element 8, 9, either directly or indirectly.

Moreover, the annular body 5 of the second sleeve element 4 and the first and second shell elements 8,9 are preferably formed separately to one another as independent self-supporting elements but are left in a semi-cured state; thereafter, they are mechanically assembled onto one another and during an injection molding step in which the core 11 is formed in its entirety are totally cured, so as that adjacent contacting portions 15, 16-28, 29 thereof are chemically and mechanically bonded together.

According to the above described process steps, two different manufacturing procedures may be envisaged.

First Possibility (Car Corner Knuckle 1 Made of Thermoset Material)

First Step—Compression Molding of the Thermoset Shell Elements 8, 9

The two shell elements 8,9 are made separately: a defined stacking sequence of plies 10 of the selected material is placed into a mold (known and not shown) with the specified shapes of the shell elements 8, 9 to be obtained. This deposition is done around locating pins that allow holes for the introduction of the outer ring 3 of the HBU and possible bushings in further manufacturing step to be obtained. The manufacturing of the two shells 8,9 can be done at the same time assuming a large mold is used. The shells 8,9 are pre-impregnated, fiber (glass and/or carbon and/or aramid) reinforced thermoset, the shells 8,9 are obtained by a compression of the stack and curing; Prepreg (pre impregnated) tapes can be previously locally deposited on the stacking sequence of plies 10 to improve the mechanical performance of the shells 8, 9 (stiffness and ultimate strength). However, these two shells 8, 9 might not be fully cured, but are partially cured (polymerized) only. It allows the removal of the shells 8,9 from the mold and to place the bushings and the outer ring 3 before the next manufacturing step. The stack of plies 10 can be made by one single type of material (for instance carbon fiber) or by an optimized sequence of different materials (for instance carbon fiber, glass fiber, aramid fibers) to achieve the required performance of stress and stiffness distribution, impact resistance at minimum cost.

Second Step—Compression Molding of the Core Material

The half cured lower shell 8 is put again into the mold with the inserted outer ring 3 and eventual bushings and a BMC material is deposited around sleeve element 3 according to a defined volume; the half cured upper shell 9 is put on the BMC and couple with the half cured lower shell 8 thanks by sliding over it. To this purpose, notches may be provided in the edges 15,16 in order to couple more easily the two half-shells 8,9 to form a box structure. The final curing stage occurs with the compression molding of the overall car corner knuckle 1. The adhesion of the outer ring 3 to these two shells 8,9 is achieved by the compression molding of the BMC core material so forming at the same time the annular body 5. Further BMC material may be arranged in specific inner volumes/spaces of the shell 8 to form the stiffeners 13 at the same time of the annular body 5. Finally, after the box structure is 15 obtained within the mold by assembling the two half-shells 8, 9 together, the inner cavity/empty space 12 remaining between the two shell elements 8, 9 may be filled partially or completely by the foam material 14, which is injected in the space 12 during the compression molding step via suitable through slots 33 (FIG. 4) provided in the half shells 8, 9.

If elastomeric bushing are to be integrated in the knuckle 1, it is also possible to use empty cylinders in the mold to provide seats where, after removal thereof at the end of the compression molding step rubber may be injected to overmold the rubber bushing directly in place.

Second Possibility (Car Corner Knuckle Made of Thermoplastic Material)

First Step—Compression Molding of the Thermoplastic Shells 8, 9

The two shells are made separately: a defined stacking sequence of plies 10 is placed into a mold with the specified shapes of the wanted shells. This deposition is done around locating pins that allow holes for the introduction of the outer ring 3 of the HBU and the eventual bushings in the next manufacturing step to be obtained. There is also the presence of small pins to create the slots or holes 3 3 that will allow the injection of the core material 11 in the next step.

The manufacturing of the two shells can be done at the same time assuming a large mold to be used. The shells 8, 9 are pre-consolidated thermoplastic plies 10 and are obtained by a stamping process. Thermoplastic tapes can be previously locally deposited on the stacking sequence of plies 10 to improve the mechanical performance of the shells 8, 9 (stiffness and ultimate strength).

The stack of plies can be made by one single type of material (for instance carbon fiber) or by an optimized sequence of different materials (for instance carbon fiber, glass fiber, aramid fibers) to achieve the required performance of stress and stiffness distribution, impact resistance at minimum cost.

After heating to the melting temperature of the material, stamping/molding and cooling down to solidification, the shells 8, 9 are removed from the mold.

Second Step—Outer Ring of the HBU and Bushings Assembly

Locating pins are replaced by the outer ring 3 of the HBU and by the eventual bushings. The shells 8, 9 are slotted thanks to notches 32 to create an empty box structure. The empty box structure contains eventual bushings and the outer ring 3 of the HBU.

Third Step—Injection Molding of the Core Material

The core material 11 is injected through the small holes/slots 32 in the shells 8, 9 previously obtained. It allows a solid adhesion between the two shells 8, 9, the outer ring 3 and the eventual bushings. The shells 8, 9 are preliminary warmed up to temperature close to melt point of the thermoplastic material.

If elastomeric bushing are to be used, an alternative would be the use of empty metal cylinders instead of directly integrating the bushings. Thus, the removal of these empty cylinders after the injection of the core material 11 would allow the injection of rubber for bushing functions.

Of course, the material LFT/DLFT for forming the annular body 5 (and the stiffeners 13 when present) and the material 14 for filling the remaining empty spaces between the two shells 8-9 coupled together may be injected separately, with different timing, or simultaneously, through different slots/holes 33.

The use of composite material allows a significant weight reduction for the suspension upright or knuckle to be obtained without reducing the stiffness in different loading paths. Having a sandwich structure allows moreover a clever use of composite material. Finally, the injected/compressed composite material has a higher volume and it is less expensive than the shell material. The shells 8, 9 are made of an expensive high-performance material for a low total volume Also, the proper selection of the materials and of the length of the fibers of the plies 10 and of those contained in the BMC or LFT/DLFT material allows to better reach such goal.

All the objects of the invention are therefore achieved.

What is claimed is:

1. A lightweight suspension upright or knuckle for a vehicle, comprising:
 a bearing connection interface configured for receiving a wheel bearing, the bearing connection interface comprising a first sleeve element; wherein
  i)—the bearing connection interface further comprises a second sleeve element arranged radially outside the first sleeve element and comprising an annular body having a radially outer lateral surface and a radially inner lateral surface and made of a composite material including reinforcing fibers dispersed in a polymer matrix;
  ii)—the lightweight suspension upright or knuckle further comprising a first and a second shell elements, both generally cup-shaped and both made of high-performance fiber reinforced composite material;
  iii)—the first shell element and the second shell element being directly coupled to the first sleeve element, the second shell element being fitted upon the first shell element, radially outside or inside thereof and radially and peripherally mating therewith, with the annular body of the bearing interface sandwiched between the first and second shell element;

iv)—the lightweight suspension upright or knuckle further comprising a core filling an empty space delimited there between by the first and second shell element, the core comprising the annular body;

v)—the radially inner lateral surface of the annular body being mechanically coupled to the first sleeve element between the first shell and the second shell;

vi) the annular body is made of a composite material selected from the group consisting of BMC (Bulk Molding Compound), LFT (Long Fiber Thermoplastic) and DLFT (Direct Long Fiber Thermoplastic), the core comprising one or more radial stiffeners molded in the same BMC/LFT/DLFT material of the annular body between the first and the second shell elements and mechanically connecting the first and second shell elements to each other and to the BMC/LFT/DLFT annular body.

2. The lightweight suspension upright or knuckle according to claim 1, wherein the core further comprises a lightweight foam material filling one of either completely or in part the empty space between the first and second shell element and wherein the BMC/LFT/DLFT annular body and the radial stiffeners are embedded; the foam material also preferably fluids tight sealing respectively mating peripheral edges of the first and second shell elements.

3. The lightweight suspension upright or knuckle according to claim 1, further comprising at least one first and one second attachment interface configured to connect the suspension upright or knuckle to control or support elements therefor; the at least one first attachment interface comprising non-annular, concave superimposed first peripheral portions of the first and second shell elements radially outstanding therefrom and arranged in contact to each other, which first peripheral portions are mechanically and chemically connected to each other in direct manner.

4. The lightweight suspension upright or knuckle according to claim 3, wherein the at least one second attachment interface comprises a third sleeve element made of high-performance composite material; the third sleeve element being mechanically and chemically connected in direct manner to adjacent opposite second peripheral portions of the first and second shell elements, so as to integrally connect the first and second shell elements to each other.

5. The lightweight suspension upright or knuckle according to claim 4, wherein the third sleeve element is at least in part sandwiched between the opposite second peripheral portions of the first and second shell elements.

6. The lightweight suspension upright or knuckle according to claim 1, wherein the second shell element is fitted upon the first shell element, radially outside thereof, each first and second shell element comprising a bottom annular wall and a lateral wall surrounding radially on the outside the annular bottom wall and axially projecting therefrom, the lateral walls of the first and second shell elements axially projecting towards each other and being mechanically and chemically joined in contact to each other in a radially superimposed manner.

7. The lightweight suspension upright or knuckle according to claim 6, wherein the annular bottom walls of the first and second shell elements are not planar, but have at least a portion thereof bulged in an axial direction, the bulged portion of the annular bottom wall of the first shell element axially projecting towards the second shell element within a cavity of the first shell element delimited by the lateral wall and the annular bottom wall thereof; the bulged portion of the annular bottom wall of the second shell element axially projecting from the lateral wall thereof on the side opposite to the first shell element and to the lateral wall of the second shell element itself; the annular body of the bearing interface being sandwiched between at least the bulged portions of the annular bottom walls of the first and second shell elements.

8. The lightweight suspension upright or knuckle according to claim 1, wherein the first and the second shell elements are both made of plies of continuous fibers embedded in a polymer matrix and stacked onto one another, wherein the fibers of each plie are mono-directionally oriented; the plies having been compression molded to one another to obtain the first and second shell elements.

9. A lightweight suspension upright or knuckle for a vehicle, comprising:

a bearing connection interface configured for receiving a wheel bearing, the bearing connection interface comprising a first sleeve element; wherein i)—the bearing connection interface further comprises a second sleeve element arranged radially outside the first sleeve element and comprising an annular body having a radially outer lateral surface and a radially inner lateral surface and made of a composite material including reinforcing fibers dispersed in a polymer matrix, the radially inner lateral surface being mechanically coupled to the first sleeve element;

ii)—the lightweight suspension upright or knuckle further comprising a first and a second shell elements;

iii)—the second shell element being fitted upon the first shell element, with the annular body of the bearing interface sandwiched between the first and second shell element;

iv)—the annular body comprising a core filling an empty space delimited there between by the first shell element and the second shell element;

v)—the core comprising one or more radial stiffeners molded in the same composite material of the annular body between the first and the second shell elements and mechanically connecting the first and second shell elements to each other and to the annular body.

10. The lightweight suspension upright or knuckle according to claim 9, wherein the annular body is made of a composite material selected from the group consisting of BMC (Bulk Molding Compound), LFT (Long Fiber Thermoplastic) and DLFT (Direct Long Fiber Thermoplastic).

11. The lightweight suspension upright or knuckle according to claim 10, wherein the core further comprises a lightweight foam material filling one of either completely or in part the empty space between the first and second shell element and wherein the BMC/LFT/DLFT annular body and the radial stiffeners are embedded; the foam material also preferably fluids tight sealing respectively mating peripheral edges of the first and second shell elements.

12. The lightweight suspension upright or knuckle according to claim 9, further comprising at least one first and one second attachment interface configured to connect the suspension upright or knuckle to control or support elements therefor; the at least one first attachment interface comprising non-annular, concave superimposed first peripheral portions of the first and second shell elements radially outstanding therefrom and arranged in contact to each other, which first peripheral portions are mechanically and chemically connected to each other in direct manner.

13. The lightweight suspension upright or knuckle according to claim 12, wherein the at least one second attachment interface comprises a third sleeve element made of high-performance composite material; the third sleeve element being mechanically and chemically connected in direct manner to adjacent opposite second peripheral portions of the first and second shell elements, so as to integrally connect the first and second shell elements to each other.

14. The lightweight suspension upright or knuckle according to claim 13, wherein the third sleeve element is at least in part sandwiched between the opposite second peripheral portions of the first and second shell elements.

15. The lightweight suspension upright or knuckle according to claim 9, wherein the second shell element is fitted upon the first shell element, radially outside thereof, each first and second shell element comprising a bottom annular wall and a lateral wall surrounding radially on the outside the annular bottom wall and axially projecting therefrom, the lateral walls of the first and second shell elements axially projecting towards each other and being mechanically and chemically joined in contact to each other in a radially superimposed manner.

16. The lightweight suspension upright or knuckle according to claim 15, wherein the annular bottom walls of the first and second shell elements are not planar, but have at least a portion thereof bulged in an axial direction, the bulged portion of the annular bottom wall of the first shell element axially projecting towards the second shell element within a cavity of the first shell element delimited by the lateral wall and the annular bottom wall thereof; the bulged portion of the annular bottom wall of the second shell element axially projecting from the lateral wall thereof on the side opposite to the first shell element and to the lateral wall of the second shell element itself; the annular body of the bearing interface being sandwiched between at least the bulged portions of the annular bottom walls of the first and second shell elements.

17. The lightweight suspension upright or knuckle according to claim 9, wherein the first and the second shell elements are both made of plies of continuous fibers embedded in a polymer matrix and stacked onto one another, wherein the fibers of each plie are mono-directionally oriented; the plies having been compression molded to one another to obtain the first and second shell elements.

18. A lightweight suspension upright or knuckle for a vehicle, comprising:
   a bearing connection interface configured for receiving a wheel bearing, the bearing connection interface comprising a first sleeve element; wherein
   i)—the bearing connection interface further comprises a second sleeve element arranged radially outside the first sleeve element and comprising an annular body having a radially outer lateral surface and a radially inner lateral surface and made of a composite material including reinforcing fibers dispersed in a polymer matrix;
   ii)—the lightweight suspension upright or knuckle further comprising a first and a second shell elements, both generally cup-shaped and both made of high-performance fiber reinforced composite material;
   iii)—the first shell element and the second shell element being directly coupled to the first sleeve element, the second shell element being fitted upon the first shell element, radially outside or inside thereof and radially and peripherally mating therewith, with the annular body of the bearing interface sandwiched between the first and second shell element;
   iv)—the lightweight suspension upright or knuckle further comprising a core filling an empty space delimited there between by the first and second shell element, the core comprising the annular body, the core further comprising one or more radial stiffeners molded in the same composite material of the annular body between the first and the second shell elements and mechanically connecting the first and second shell elements to each other and to the annular body.

\* \* \* \* \*